United States Patent [19]
Shamine et al.

[11] Patent Number: 5,607,500
[45] Date of Patent: Mar. 4, 1997

[54] DESICCANT AIR DRYER WITH COMBINED ATTACHMENT AND AIR FLOW MANAGEMENT COMPONENT

[75] Inventors: Dennis R. Shamine; Paul G. Reisinger, both of Lorain, Ohio

[73] Assignee: AlliedSignal Truck Brake Systems Co., Elyria, Ohio

[21] Appl. No.: 498,164

[22] Filed: Jul. 5, 1995

[51] Int. Cl.⁶ .................................. B01D 35/00
[52] U.S. Cl. .................. 96/144; 55/DIG. 17; 96/138; 96/141; 96/147; 96/151
[58] Field of Search ................... 55/318, 385.3, 55/DIG. 17; 95/117, 122; 96/134, 136, 137, 138, 141, 147, 143, 144, 151, 149

[56] References Cited

U.S. PATENT DOCUMENTS

| | | | |
|---|---|---|---|
| 1,930,357 | 10/1933 | Heather . | |
| 2,317,816 | 4/1943 | Scott . | |
| 2,505,581 | 4/1950 | Unger . | |
| 2,606,628 | 8/1952 | Hasselwander | 55/DIG. 17 |
| 2,845,138 | 7/1958 | Gageby | 96/138 |
| 3,353,339 | 11/1967 | Walter | 96/137 |
| 3,475,885 | 11/1969 | Kline . | |
| 3,655,906 | 5/1972 | De Palma . | |
| 3,796,025 | 3/1974 | Kasten . | |
| 4,385,913 | 5/1983 | Lane . | |
| 4,505,727 | 3/1985 | Cullen et al. . | |
| 4,713,094 | 12/1987 | Yanagawa et al. . | |
| 4,816,047 | 3/1989 | Neal | 96/137 |

FOREIGN PATENT DOCUMENTS

| | | | |
|---|---|---|---|
| 2560063 | 8/1985 | France | 55/DIG. 17 |

OTHER PUBLICATIONS

Service Data – AD–9 Air Dryer, Nov. 1992.

*Primary Examiner*—C. Scott Bushey
*Attorney, Agent, or Firm*—Howard G. Massung

[57] ABSTRACT

A desiccant type air dryer assembly having an integral purge volume with a body assembly and a removable desiccant cartridge. A retention bolt is provided in the body assembly which serves the two-fold function of retaining the cartridge and body assembly in an assembled condition as well as providing a flow passageway for air moving through the air dryer.

11 Claims, 3 Drawing Sheets

DESICCANT AIR DRYER WITH COMBINED ATTACHMENT AND AIR FLOW MANAGEMENT COMPONENT

BACKGROUND OF THE INVENTION

This invention relates to a component for a motor vehicle air brake system, and particularly, to an air dryer assembly.

Many motor vehicles, and in particular, heavy duty trucks incorporate air brake systems which use air pressure to control application of the vehicle service brakes. These systems have an air compressor driven by the vehicle engine which charges a brake system reservoir with high pressure air. The air compressor is controlled to supply air intermittently as needed to replenish the reservoir and maintain reservoir pressure within a predetermined range.

The process of compression of air results in the precipitation of water. Water and particulates in the air brake system can lead to component deterioration and interfere with optimal operation of the brake system. Accordingly, there are various devices used for removing water from the compressed air in air brake systems, known as air dryers. The function of an air dryer is to collect and remove air system contaminants in solid, liquid and vapor form before they enter the brake system. The air dryer provides clean, dry air for the components of the brake system which increases the life of the system and reduces maintenance costs. One type of air dryer incorporates a desiccant material which eliminates daily manual draining of water collection reservoirs as is required in other types of air dryers.

Desiccant type air dryers employ a volume of desiccant material which is hydrophilic and thus absorbs water which passes through an air line from the air compressor. High pressure air enters the desiccant air dryer and the water is stripped by the desiccant material. The air dryer also includes a particulate filter for trapping particulates and oil. Eventually, the desiccant material absorbs water to its maximum capacity. As a means of expelling this trapped water, modern desiccant type air dryers incorporate a backflow or purge air flow as a means of stripping the desiccant of absorbed water. A reservoir referred to as a purge volume is provided with is charged with the high pressure air supplied by the compressor. When the compressor cycles from a loaded mode producing compressed air to the unloaded mode, the purge volume air is allowed to leak to atmosphere through the desiccant bed in a reverse flow direction, stripping it of moisture and expelling it into the air. External purge volume air dryer types use a purge volume reservoir separate from the air dryer and connected to it by an air line. Another type is a so-called integral purge volume type in which the housing which contains a desiccant material also defines the purge volume. These types are in widespread use today and provide excellent performance.

In modern desiccant type air dryers some means of removing the desiccant material is provided since it requires rejuvenation after a service life period. In use, the desiccant material absorbs contaminants such as oil which ultimately reduces its water retention characteristics. Since other components of air dryers have a longer service life, a convenient system for removing the desiccant material is desired. In one type of air dryer, spin-on type desiccant cartridges are used. The desiccant cartridge resembles a conventional motor vehicle spin-on oil filter in a form of a canister with a load plate having a centrally threaded bore such that the entire unit is threaded onto an upstanding boss on a mounting surface. A new generation type of desiccant cartridge is being offered by the assignee of this application. In this type, a retention bolt which passes through the air dryer body with threads in the desiccant cartridge load plate. The retention bolt is externally accessible, allowing a tool to engage it for mounting and dismounting the desiccant cartridge. This invention is related to a desiccant cartridge of the later type.

In desiccant air dryers incorporating a desiccant cartridge, a number of isolated air flow passages and chambers are formed by these components which are sealed from one another and communicate in a controlled manner. Accordingly, both the desiccant cartridge and body assembly define a number of distinct flow paths requiring specific structural features. As with all components intended for mass production, designers of these components continually strive to reduce their costs in terms of material cost, and assembly and fabrication requirements.

In view of the foregoing it is an object of this invention to provide a desiccant type air dryer having design improvements intended to reduce component part, and assembly costs while providing high reliability and quality.

SUMMARY OF THE INVENTION

In accordance with the present invention an air dryer is provided in which the removable desiccant cartridge is mounted in place by a retention bolt passing through the air dryer body assembly and threading into a centrally disposed threaded bore in the desiccant cartridge load plate. The retention bolt is accessible from the exposed bottom of the body assembly which is generally unobstructed since clearance must be present for a number of air lines to be connected to that part of the device. Interlocking engagement between the desiccant cartridge and body assembly prevents these two components from rotating relative from one another during the process of mounting and dismounting the desiccant cartridge. The retention bolt component of the air dryer of this invention further defines flow passages for air movement through the body assembly. In this way, the retention bolt provides two distinct functions; namely, a retention feature as well as defining air flow passageways. Use of the retention bolt in accordance with this invention simplifies the design of the body casting and the desiccant cartridge load plate.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
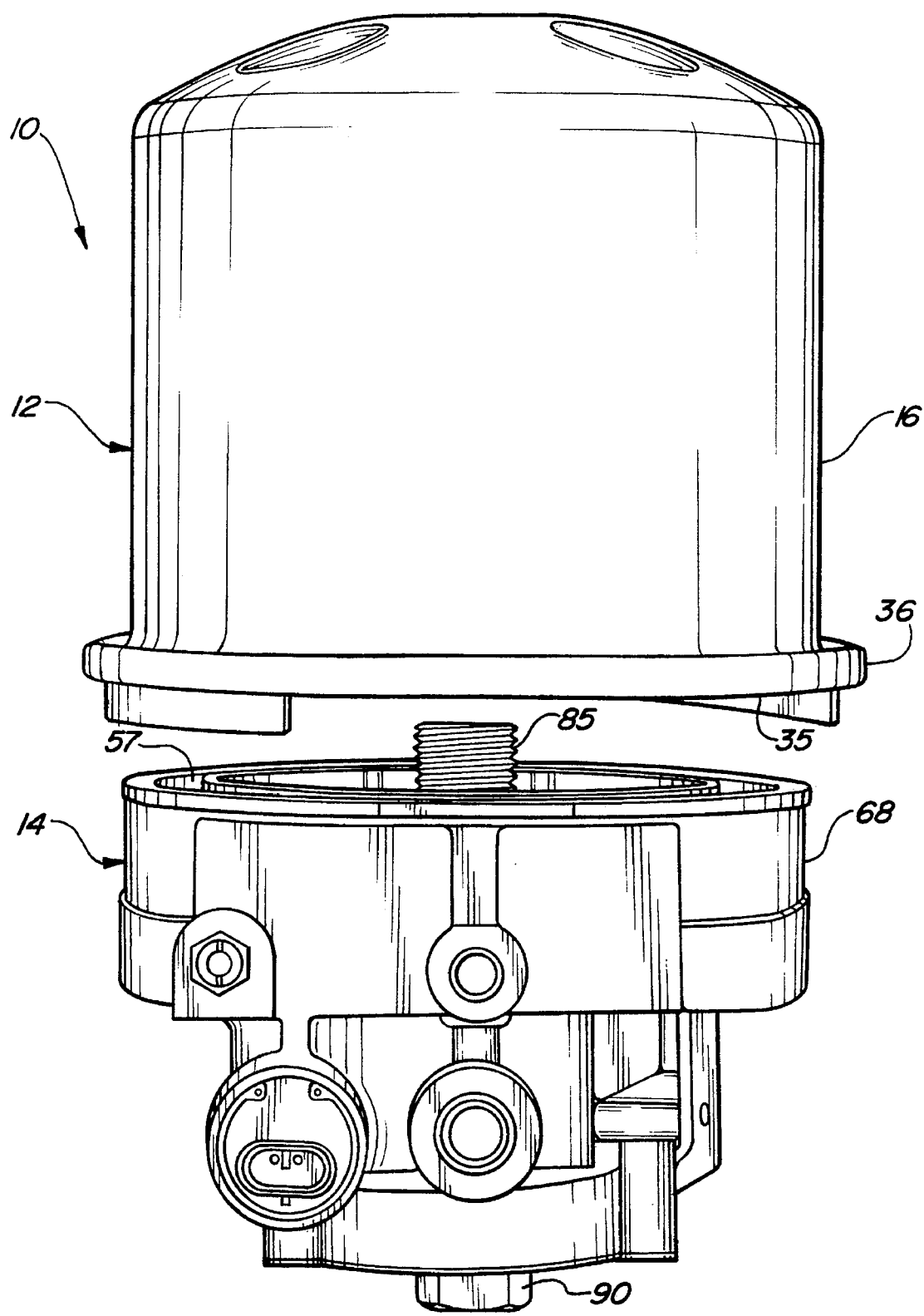
FIG. 1 is an exploded elevational view of an air dryer in accordance with the present invention.
Figure 2:
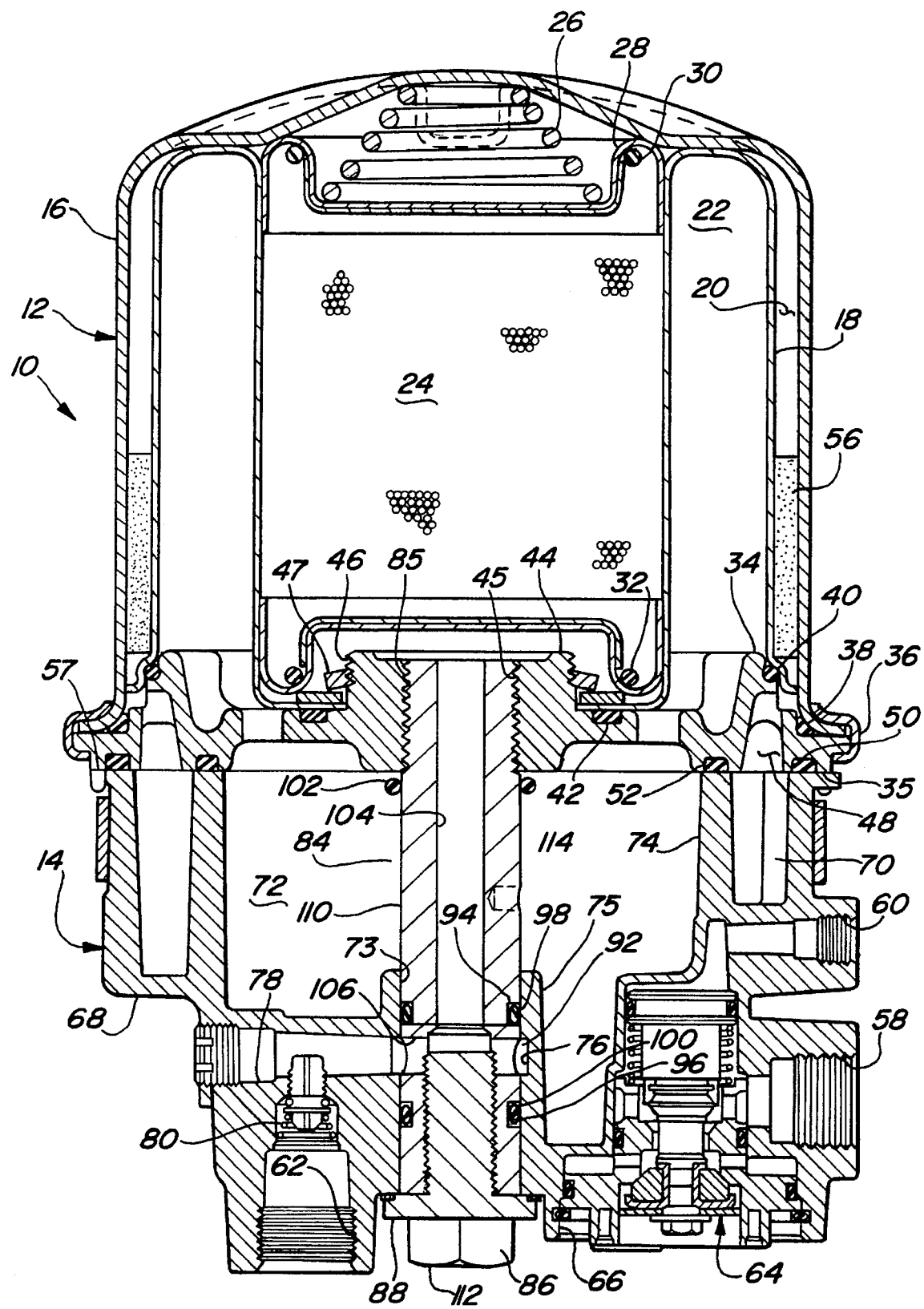
FIG. 2 is a cross-sectional view through the air dryer of FIG. 1 showing the air dryer assembled and internal components of the device.

An air dryer in accordance with the present invention is shown in FIGS. 1 and 2 and is generally designated by reference number 10. Air dryer 10 is particularly suited for use in an air supply system for motor vehicle air brakes, such as found in heavy duty trucks. Air dryer 10 principally comprises two detachable components; namely, desiccant cartridge 12 and body assembly 14.

Details of the construction of desiccant cartridge 12 are best described with reference to FIG. 2. Cartridge 12 has a drawn sheet metal cup-shaped outer shell 16. Double-wall inner sleeve 18 is disposed within outer shell 16 and defines a radial clearance passageway 20 around its outer perimeter, and further defines an annular interior cavity 22. Disposed within the inside cylindrical surface of inner sleeve 18 is desiccant bed 24. Desiccant bed 24 is comprised of a bead like granular material which has hydrophilic properties. The material comprising desiccant bed 24 is compressed by spring 26 and is retained by cloth sack 28 covering the upper and lower ends of the desiccant bed. Cloth sack 28 is maintained in position by O-rings 30 and 32. Spring 26 maintains desiccant bed 24 in a densely packed condition for optimal performance.

Air dryer cartridge outer shell 16 and inner sleeve 18 are affixed to load plate 34. As shown, outer shell 16 is affixed to load plate 34 by a rolled perimeter band 36. Load plate 34 has a bottom mounting surface 35 for mating with body assembly 14. O-rings 38, 40 and 42 are used to provide isolated volumes within cartridge 12, as will be described in greater detail below. At the center of load plate 34 is boss 44 having internal threads 45 and external threads 46. Nut 47 is screwed onto boss threads 46 to retain inner sleeve 18 onto load plate 34. An outer groove 48 in the bottom surface of load plate 34 communicates with cartridge outer passageway 20 through internal passageways (not shown). O-rings 50 and 52 are positioned within concentric grooves on the bottom mounting surface of load plate 34 for sealing engagement with features of body assembly 14, as will be described in greater detail as follows. Porous filter 56 is positioned in cartridge outer passageway 20 and performs a filtration function, collecting particulates and oil.

Body assembly 14 forms a top mounting surface 57 for mating with load plate mounting surface 35. Body assembly 14 further defines supply port 58 which receives compressed air from the system air compressor (not shown). Control port 60 receives a compressor control air signal which actuates the system compressor to cycle between a loaded mode producing compressed air and an unloaded mode. Delivery port 62 discharges de-watered compressed air. Purge valve assembly 64 is positioned within purge port 66 in the bottom surface of body casting 68 and communicates with supply port 58 and control port 60.

Body casting 68 defines two separate concentric internal cavities. Outer cavity 70 in the form of a perimeter groove is positioned between O-rings 50 and 52, and opens between the 0-rings. Central cavity 72 is defined within wall 74 at the lower portion of body assembly casting 68. Bore 73 is provided through boss 75 which extends partway into central cavity 72. Groove 76 is formed by bore 73. A radially drilled bore 78 intersects bore 73 at groove 76 and communicates with delivery port 62, having check valve 80 installed therein.

Retention bolt 84 is shown in FIG. 2 and as will be explained in more detail, serves multiple functions. Retention bolt 84 has a generally smooth exterior cylindrical surface with threaded end 85 and an opposing driving end 86. Threaded end 85 is adapted to mesh with load plate internal threads 45. Driving end 86 is adapted to be engaged by a tool for rotating it. Flange 88 bears against a lower surface of body casting 68. Retention bolt 84 further forms air flow groove 92 with a pair of seal grooves 94 and 96 located axially on both sides of groove 92. O-rings 98 and 100 are positioned in the associated grooves 94 and 96. O-ring 102 is positioned on the exterior of retention bolt 84 and serves a retention feature, as will be explained in more detail below. Central bore 104 runs through retention bolt 84 and is threaded at the lower end of the bolt. Through bore 106 passes diametrically through the retention bolt and intersects central bore 104. To reduce air flow losses, the unobstructed portion of bore 104 should not extend significantly beyond bore 106.

Retention bolt 84 as shown in FIG. 2 is formed of a two piece construction, with tube 110 and bolt 112 installed within the threaded portion of central bore 104. Once bolt 112 is installed within tube 110, it is intended that they will not later be disassembled. Accordingly, locking threads or other locking features can be provided.

When retention bolt 84 is in its installed position as shown in FIG. 2, central bore 104 provides an air flow path from desiccant bed 24 through bore 106, groove 92, and into casting bore 78. Purge orifice 114 communicates bolt central bore 104 with body casting central cavity 72. O-rings 98 and 100 provide isolation between central bore 104 and central cavity 72, except through purge orifice 114.

When it is desired to remove desiccant cartridge 12 from body assembly 14 bolt driving head 86 is actuated by a tool, thus unthreading it from load plate 34. Retention bolt 84 is prevented from dropping completely out of engagement with body assembly 14 due to the presence of retention O-ring 102. If it were desired to entirely remove the retention bolt, it could readily be forcibly removed by pulling the bolt forcing retention O-ring 102 off the bolt.

Operation of air dryer 10 will now be described. In the loaded mode, the system compressor supplies high pressure air to supply port 58. This air passes through purge valve assembly 64, into body outer cavity 70, and into cartridge outer passageway 20. Air thus flows upwardly through filter 56 where particulate contaminants and oil are stripped from the air flow. Air then passes to the top of outer shell 16 and downwardly through desiccant bed 24 which strips water from the compressed air. The dry air then passes into retention bolt central bore 104 and then exits through bore 78, check valve 80, and delivery port 62. During the compressor loaded mode, this high pressure air is allowed to flow through orifice 114 into an integral purge volume defined by body central cavity 72 and cartridge inner sleeve annular interior cavity 22. Thus, this purge volume reaches the pressure of air flowing from delivery port 62.

In operation of air dryer 10 in a vehicle air supply system, once the pressure in the system's reservoir (not shown) has reached a set point, a high pressure air signal is sent to a compressor control port causing it to cycle to the unloaded mode and to air dryer control port 60. An internal diaphragm within purge valve assembly 64 closes supply port 58 and opens body outer chamber 70 to atmosphere through purge port 66. Air cannot escape the unit through delivery port 62 due to the action of check valve 80. When this occurs, the compressed air stored within the purge volume slowly leaks from orifice 114 toward purge valve assembly 64, generating a reverse air flow upwardly through retention bolt central bore 104 and desiccant bed 24. This reverse purging air flow causes water to be stripped from the desiccant bed as well as some oil and solid contaminants from filter 56 which are expelled through purge valve assembly 64.

Retention bolt 84 thus provides a two-fold function, acting to retain desiccant cartridge 12 onto body assembly 14 as well as providing a flow passageway for air moving through air dryer 10.

Figure 3:
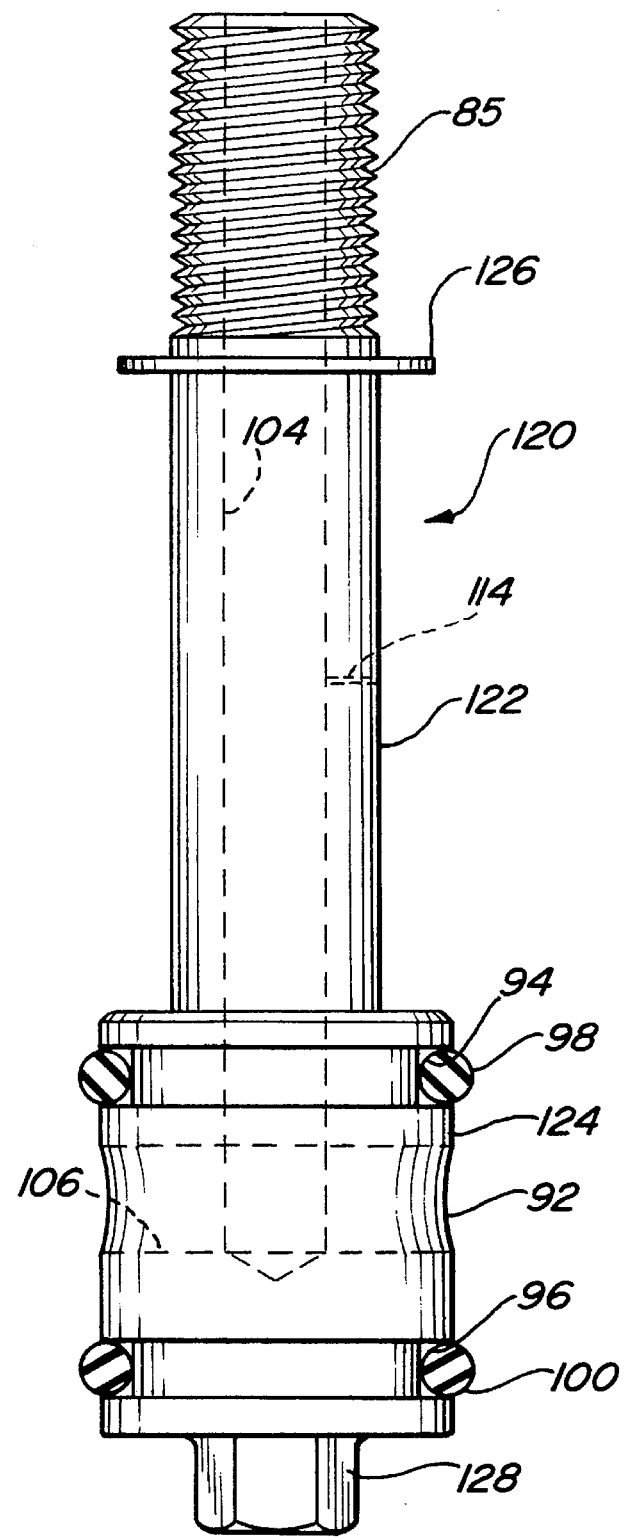
FIG. 3 is an elevational view of an alternate embodiment of the retention bolt component in accordance with this invention.

Now with reference to FIG. 3, a second embodiment of a retention bolt is illustrated. Those components and features of this embodiment which are identical to those of retention bolt 84 are identified by like reference numbers and the prior description suffices for this embodiment as well. Retention bolt 120 differs from bolt 84 in that its body has a one-piece construction. Retention bolt 120 has two diameter sections, small diameter section 122 and large diameter section 124, the latter of which is located within body casting bore 73. Naturally, the threaded diameter of load plate bore 45 is sized to accommodate the diameter of retention bolt threaded end 85. Retention bolt 120 employs snap ring 126 installed within a perimeter groove as a means of retaining the bolt in the process of mounting and dismounting the desiccant cartridge, as explained previously.

When using bolt 126, body bore 73 would be modified to engage the shoulder between diameter sections 122 and 124. Due to the presence of central passage 104, retention bolts 84 and 120 have a significant diameter. Service personnel viewing a large driving head would be encouraged to apply a significant torque to the bolt during the process of tightening it, possibly causing structural damage to air dryer 10. Accordingly, retention bolt 120 shown in FIG. 3 has a reduced dimension driving head 128 which would discourage such over-torquing.

It is to be understood that the invention is not limited to the exact construction illustrated and described above, but that various changes and modifications may be made without departing from the spirit and scope of the invention as defined in the following claims.

We claim:

1. An air dryer assembly for a motor vehicle air supply system, comprising:

a cartridge having a cup shaped outer shell, said outer shell affixed to a load plate having air flow passages therethrough, said load plate having a first threaded means, said cartridge having a desiccant material therein for removing water from air passing through said air supply system, a body assembly having a supply port and a discharge port for connection with said air supply system and a mounting surface enabling said cartridge load plate to be mated to said body assembly whereby said cartridge and said body assembly cooperate to form air flow passageways for said air passing through said air dryer assembly, said body assembly having a central bore passing through said body assembly and opening in said body assembly mounting surface, said central bore being aligned with said cartridge load plate first threaded means when said cartridge and said body assembly are mated together, and a retention bolt positioned through said body assembly central bore and having second threaded means engaging said cartridge load plate first threaded means thereby fastening said cartridge and said load plate assembly, said retention bolt having a driving head accessible for rotating said retention bolt, said retention bolt having a hollow interior passage communicating with said cartridge desiccant material and to said discharge port of said air dryer, said hollow interior passage conducting air to said discharge port after passing through said desiccant material.

2. An air dryer system according to claim 1 wherein said first threaded means comprises internal threads within a bore in said load plate and said second threaded means comprises external threads formed at one end of said retention bolt.

3. An air dryer system according to claim 1 wherein said body defines an interior central cavity with said retention bolt at least partially exposed to said central cavity.

4. An air dryer system according to claim 3 wherein said body assembly further defining an internal boss forming a portion of said body central bore with a discharge bore in said lower body communicating with said central bore and said discharge port, whereby air flowing through said retention bolt interior passage communicates with said discharge port.

5. An air dryer system according to claim 4 wherein said body assembly interior central cavity defines at least part of a purge volume for purging said desiccant material.

6. An air dryer system according to claim 5 wherein said retention bolt forms an orifice communicating said retention bolt interior passage with said interior central cavity.

7. An air dryer system according to claim 4 wherein said retention bolt forming a first and second seal groove with seals installed therein and engaging said body assembly central bore.

8. An air dryer assembly for a motor vehicle air supply system, comprising:

a cartridge having a cup shaped outer shell, said outer shell affixed to a load plate having air flow passages therethrough, said load plate having a first threaded means, said cartridge having a desiccant material therein for removing water from air passing through said air supply system, a body assembly having a supply port and a discharge port for connection with said air supply system and a mounting surface enabling said cartridge load plate to be mated to said body assembly whereby said cartridge and said body assembly cooperate to form air flow passageways for said air passing through said air dryer assembly, said body assembly having a central bore passing through said body assembly and opening in said body assembly mounting surface, said central bore being aligned with said cartridge load plate first threaded means when said cartridge and said body assembly are mated together, said body assembly forming an interior central cavity and an upstanding boss extending into said interior central cavity said central bore extending through said boss, and a discharge bore passing into said boss and communicating said central bore with said discharge port, said body assembly interior central cavity defining part of a purge volume for purging said desiccant material, and a retention bolt positioned through said body assembly central bore and having second threaded means engaging said cartridge load plate first threaded means thereby fastening said cartridge and said load plate assembly, said retention bolt having a driving head accessible for rotating said retention bolt, said retention bolt having a hollow interior passage communicating at one end of said bolt with said cartridge desiccant material and adjacent the opposite end of said bolt to said discharge bore and said discharge port of said air dryer, said hollow interior passage conducting air to said discharge port after passing through said desiccant material.

9. An air dryer system according to claim 8 wherein said first threaded means comprises internal threads formed by a bore in said load plate and said second threaded means comprises external threads formed at one end of said retention bolt.

10. An air dryer system according to claim 8 wherein said retention bolt forms an orifice communicating said retention bolt hollow interior passage with said interior central cavity.

11. An air dryer system according to claim 8 wherein said retention bolt forming a first and second seal groove with seals installed therein and engaging said body assembly central bore with a through bore intersecting said bolt hollow interior passage, said through bore communicating with said body assembly discharge bore.

* * * * *